June 3, 1930.  W. KÖCHLING  1,761,732
TRANSFORMER
Filed Jan. 18, 1929

Inventor:
Wilhelm Köchling,
by Charles E. Tullar
His Attorney.

Patented June 3, 1930

1,761,732

UNITED STATES PATENT OFFICE

WILHELM KÖCHLING, OF BERLIN-WAIDMANNSLUST, GERMANY, ASSIGNOR TO GENERAL ELECTRIC COMPANY, A CORPORATION OF NEW YORK

TRANSFORMER

Application filed January 18, 1929, Serial No. 333,390, and in Germany January 28, 1928.

My invention relates to transformers similar in some respects to that disclosed in my United States Patent No. 1,653,107, issued December 20, 1927. In that patent, a transformer may have great capacity without being excessively tall. The general object of the present invention is to provide an improved arrangement of windings which, for some purposes, have advantages not found in the arrangement disclosed in my earlier patent.

Figure 1:
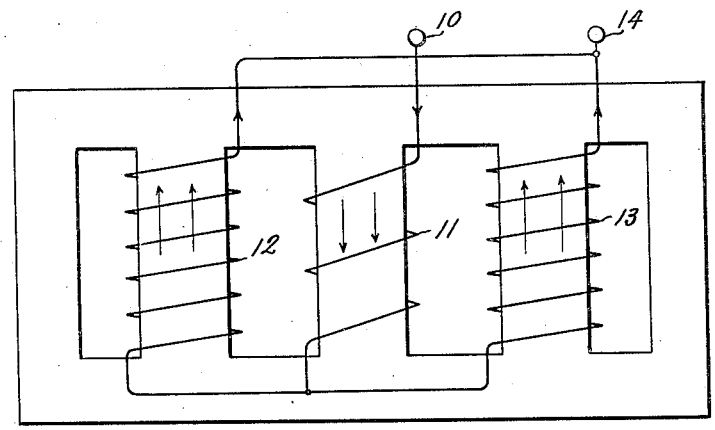
Figure 2:
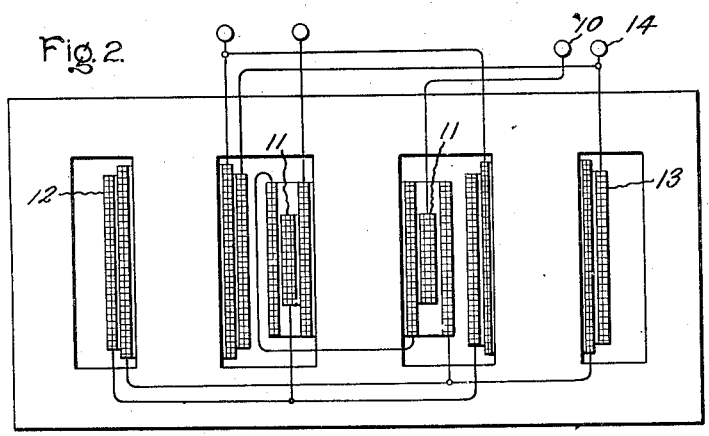
Figure 3:
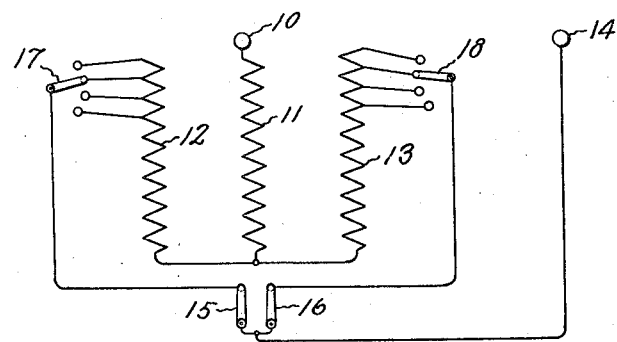

The invention will be explained more in detail in the following description taken in connection with the accompanying drawing, in which Fig. 1 shows a transformer core with a winding arranged in accordance with the invention; Fig. 2 shows a transformer core with two main windings, one of which is arranged like that shown in Fig. 1, and Fig. 3 is a diagrammatic view of a main winding provided with taps and switches for purposes which will be described later.

Like reference characters indicate similar parts in the different figures of the drawing.

In accordance with the present invention, a particularly useful winding arrangement includes three winding sections distributed on three winding legs of a core as shown in the drawing, two of the winding sections being connected in parallel with each other and both of them in series with the third section. It is preferable that the two parallel connected sections be on the outer winding legs which are at opposite sides of the third winding section.

With this winding arrangement, the current path, starting at the terminal 10 of the center or series winding section 11, extends through this winding section 11 and then divides symmetrically through the two parallel connected winding sections 12 and 13 on the outer winding legs to a common terminal 14. If the ampere-turns on the three winding legs are to be equal, then the winding section 11 on the center winding leg must have only one-half as many turns as each of the two winding sections 12 ad 13 and the cross-section of the conductor should be twice as great in the winding section 11 as in either of the other sections because it carries twice as much current.

The arrangement described is well adapted for use in three single phase transformers connected together into a three phase star connected bank with the neutral point grounded. In this case, the winding section 11 operates at higher potential than the other sections and its turns may be well separated and provided with extra heavy insulation, while the sections 12 and 13 may have much less insulation. This grading of the insulation with the winding distributed on three winding legs of the core gives much better results than can be secured with the usual single phase transformer having only one or two winding legs because in the latter case the grading of the insulation produces a non-uniform distribution of ampere-turns with excessive axial forces in case of a short circuit.

In the arrangement which has been described, the three sections 11, 12 and 13 of the winding are all wound in the same direction as indicated in Fig. 1. In addition to the three winding legs, the core preferably has two outer legs without windings. In these respects, the construction is similar to a five-legged three-phase transformer with a star-connected winding, it being different however in that the number of turns and the cross section of the conductor are not the same in all three of the winding sections. If the number of turns were made the same in all three of the winding sections 11, 12 and 13 as indicated in Fig. 3, there would be twice as many ampere-turns in the center winding section 11 as in either of the outer sections 12 or 13 and the leakage flux would be greatly increased in the center section 11 and somewhat decreased in the outer sections 12 and 13, the total leakage flux of the transformer being appreciably increased. This disadvantage may be avoided, however, with a double concentric winding arrangement on the center winding leg, the center winding section 11 being interposed between two concentrically disposed sections of the corresponding section of the other main winding as shown in Fig. 2. Now, referring to Fig. 3, if the connection between the upper ends of the winding sections 12 and 13 be opened, as by opening the switches 15 and 16, then the transformer may be used as a three-phase star-connected transformer.

When connected for single phase operation, the cross section of the conductor in the center winding section 11 should be twice as great as in each of the outer winding sections 12 and 13. This relation may be changed however if desired for the benefit of the outer winding sections 12 and 13 when the transformer is operating as a three-phase transformer in which case the cross section of the conductor should be the same in all three winding sections. For example, the ratio between the cross section of the conductor in the center winding section 11 and in each of the outer winding sections 12 and 13 may be made equal to 1.66 to 1.17. This would not change the total amount of copper in the three winding sections. When operating as a single phase transformer at full load, the center winding section 11 would be about 17% overloaded and each of the outer sections 12 and 13 would be about 17% underloaded. While operating as a three-phase transformer at full load, the center winding section 11 would be about 17% underloaded and each of the outer sections 12 and 13 would be about 17% overloaded.

For the purpose of considering the voltage relations in the three phase and single phase operation of this transformer, let the voltage of each of the winding sections 11, 12 and 13 be equal to $\frac{1}{\sqrt{3}}$ so that the three phase voltage will be equal to 1 when the windings are connected for three phase operation. The single phase voltage will be twice that of one winding section, or $\frac{2}{\sqrt{3}}$ when the windings are connected for single phase operation. With three units operating individually as single phase transformers but connected together to operate as a star-connected three-phase bank, the three-phase voltage will be $\frac{2\sqrt{3}}{\sqrt{3}}$ or 2. The ratio of the output, or load capacity, of one unit used as a three-phase transformer and the output, or load capacity, of the three-phase bank composed of three single phase units is 1 to 3. The corresponding voltages, however, are in the ratio of 1 to 2. Therefore, by simply adding two units to the original single unit, the output or load capacity may be trebled and the operating voltage doubled, the change to the higher voltage not having required any changes in the transformer construction except in the connections between the winding sections.

The invention thus solves a problem which is often met with in connection with the transmission of electrical energy, the problem being to operate initially at a low voltage to supply a small amount of power, and later, as the demand for power increases, to supply a much larger amount of power at a much higher voltage, and without the necessity of discarding the original transformer, or transformers, or of making extensive changes in them.

As shown in Fig. 3, the outer or parallel connected winding sections 12 and 13 may be provided with taps connected to the tap switches 17 and 18. These switches may be used to vary, or regulate, the voltage ratio of the transformer without interrupting the load current. This may be done by changing the positions of the tap switches 17 and 18 alternately so that at least one of them is always closed. While the position of either of the switches 17 or 18 is being changed, the corresponding switch 15 or 16 should be open so that the tap switches never have to break any current. While either of the switches 15 or 16 is open, the other of these switches with its corresponding winding section 12 or 13 is carrying the load current.

In case of a fault in either of the outer winding sections 12 or 13, the corresponding switch 15 or 16 may be opened and the transformer operated at about two thirds normal capacity or less.

The invention has been explained by describing certain arrangements and modifications thereof and it will be apparent that further changes may be made without departing from the scope of the invention as defined in the appended claims.

What I claim as new and desire to secure by Letters Patent of the United States is:

1. A transformer including a magnetic core having three winding legs and a winding including a section surrounding each of said winding legs, two of said winding sections being connected in parallel with each other and in series with the third winding section, said third winding section being connected to one line terminal and said parallel winding sections being connected together and to a second line terminal, whereby said transformer may be operated single phase.

2. A transformer including a magnetic core having a center winding leg and two outer winding legs, and a winding including a section surrounding each of said winding legs, the two winding sections surrounding said outer winding legs being connected in parallel with each other and in series with the winding section surrounding said center winding leg, said center winding section being connected to one line terminal and said parallel winding sections being connected together and to a second line terminal, whereby said transformer may be operated single phase.

3. A transformer including a magnetic core having three winding legs, a winding including a section surrounding each of said winding legs, two of said winding sections being connected in parallel with each other and in series with the third winding section, and a second winding distributed on said three winding legs, the portion of said second winding on the same winding leg with said third section of the first winding including two concentric parts with said third section disposed between them.

4. A transformer including a magnetic core having three winding legs, and a winding including a section surrounding each of said winding legs, two of said winding sections being connected in parallel with each other and in series with the third winding section, whereby the current in said third section will be twice that in each of said parallel connected sections, and the cross section of the conductor in said third section being less than twice that of either of said parallel connected sections.

In witness whereof, I have hereunto set my hand this 2nd day of January. 1929.

WILH. KÖCHLING.